(No Model.) 3 Sheets—Sheet 3.

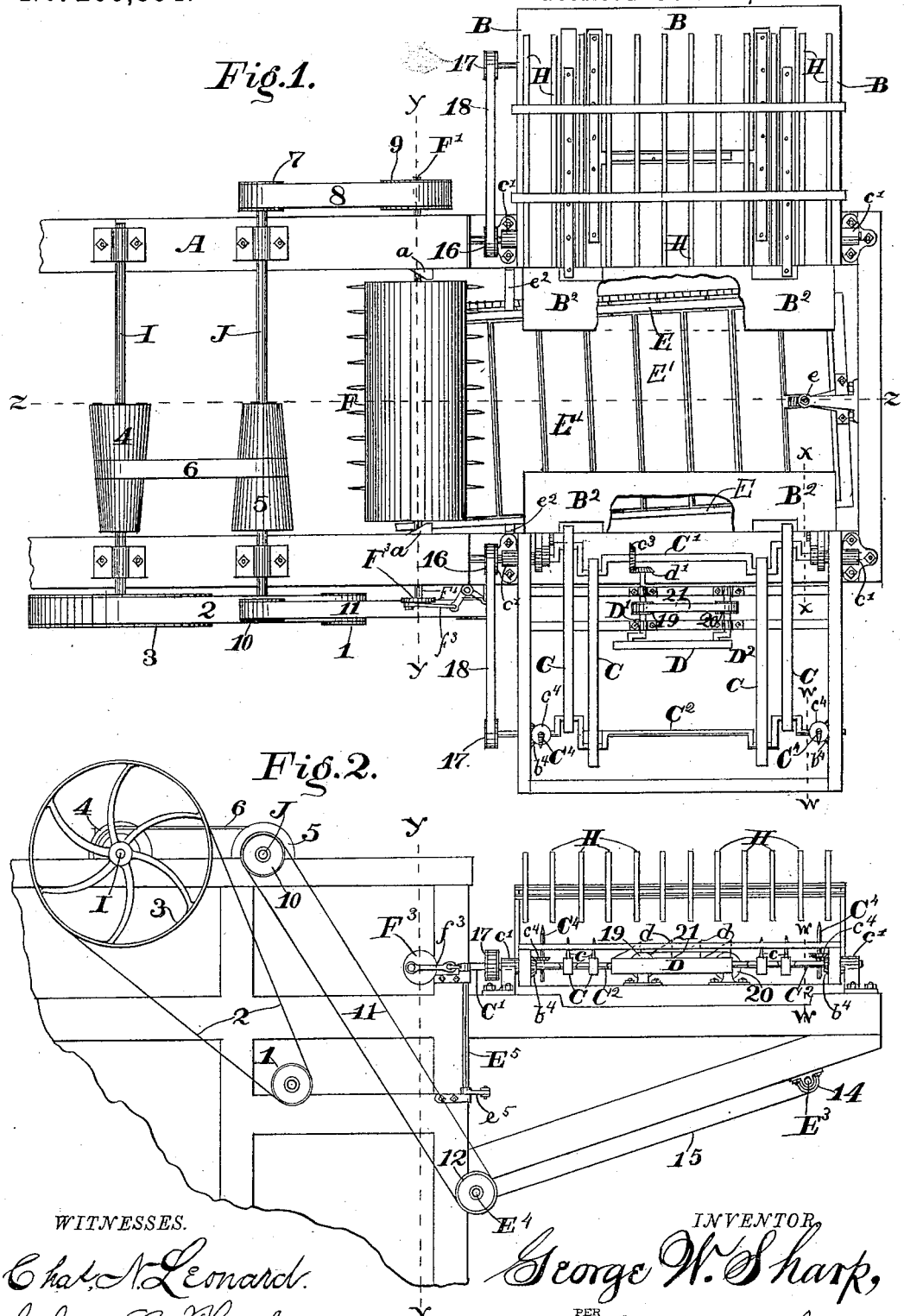

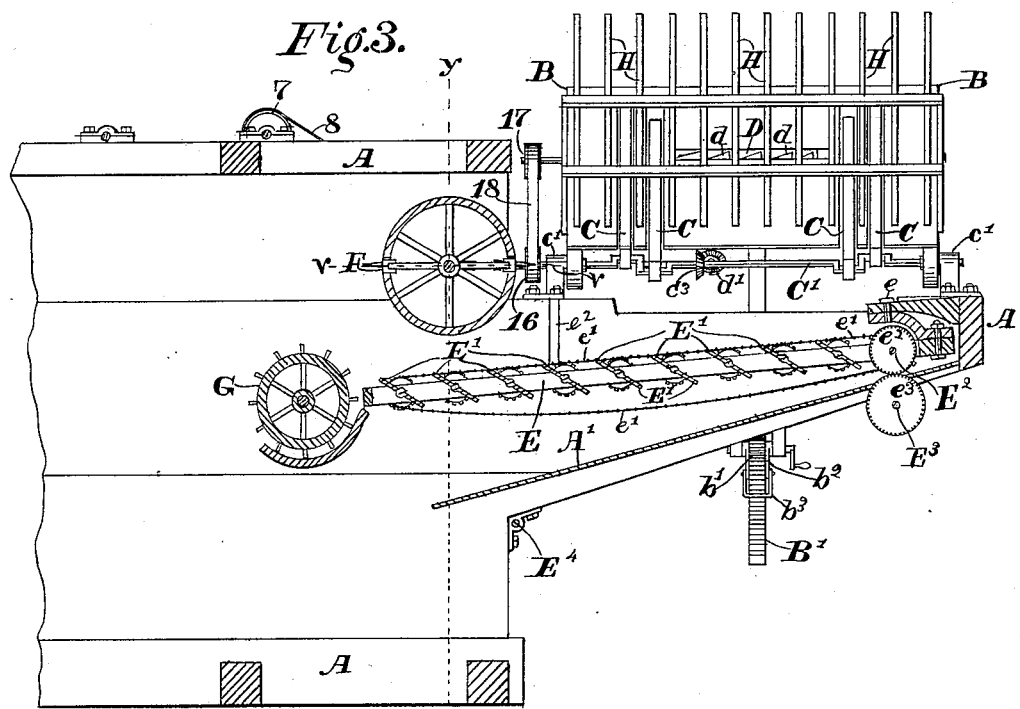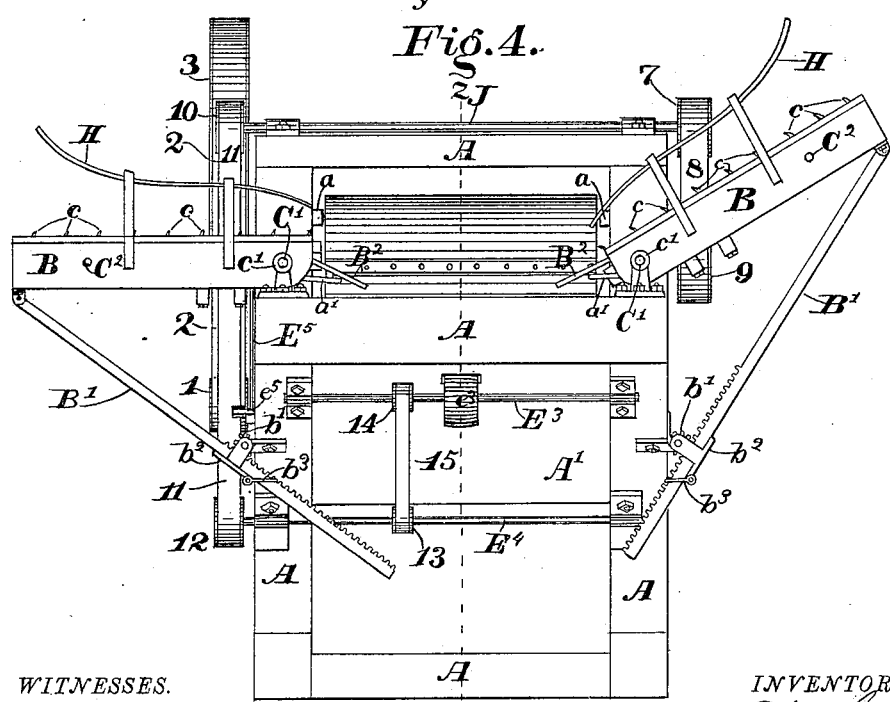

G. W. SHARP.
BAND CUTTER AND FEEDER.

No. 266,394. Patented Oct. 24, 1882.

WITNESSES.
Chas. N. Leonard.
Chas. L. Thurber.

INVENTOR.
George W. Sharp,
PER
C. Bradford,
ATTORNEY.

UNITED STATES PATENT OFFICE.

GEORGE W. SHARP, OF CRAWFORDSVILLE, INDIANA.

BAND CUTTER AND FEEDER.

SPECIFICATION forming part of Letters Patent No. 266,394, dated October 24, 1882.

Application filed July 8, 1882. (No model.)

*To all whom it may concern:*

Be it known that I, GEORGE W. SHARP, of the city of Crawfordsville, county of Montgomery and State of Indiana, have invented certain new and useful Improvements in Band Cutters and Feeders, of which the following is a specification.

Figure 5:
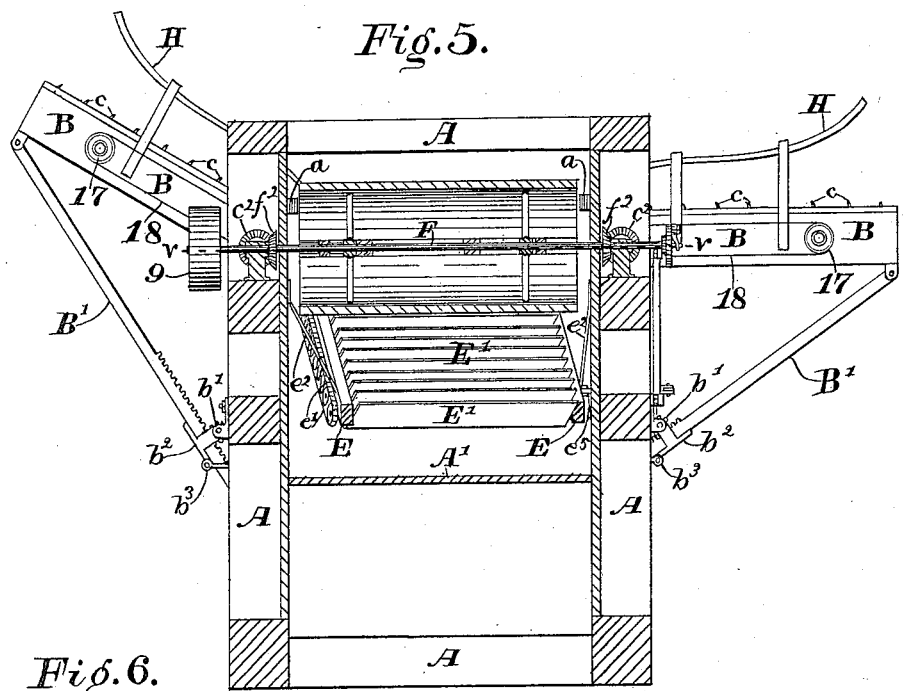
Figure 6:
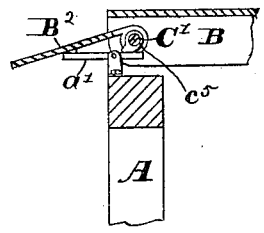
Figure 7:
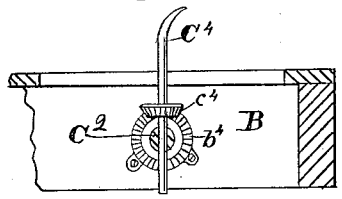
Figure 8:
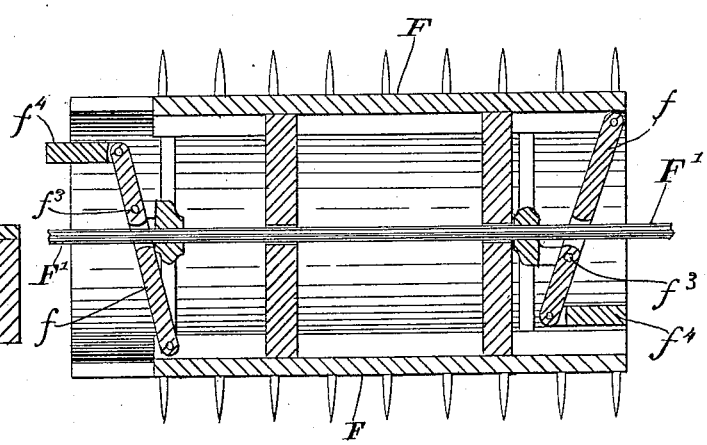

The object of my said invention is to improve the construction and increase the efficiency of that class of machines known as "band cutters and feeders for thrashing-machines." This object is accomplished by certain arrangements and combinations of parts, which will hereinafter be more fully described.
Referring to the accompanying drawings, which are made a part hereof, and on which similar letters of reference indicate similar parts, Figure 1 is a top or plan view of the front end of a machine embodying my invention, a part of the top or covering portions being removed; Fig. 2, a side elevation thereof; Fig. 3, a longitudinal vertical section on the dotted line $z\ z$ in Figs. 1 and 4; Fig. 4, a front end elevation, one of the side tables being partly raised up; Fig. 5, a transverse vertical sectional view, looking to the right from the dotted line $y\ y$ in Figs. 1, 2, and 3; Fig. 6, a detail sectional view on the dotted line $x\ x$ in Fig. 1, showing the mechanism for operating the extension $B^2$; Fig. 7, a detail section, on an enlarged scale, looking toward the finger $C^4$ from the dotted line $w\ w$ in Figs. 1 and 2; and Fig. 8, a horizontal sectional view of the scatterer F on the dotted line $v\ v$ in Fig. 3, also on an enlarged scale.

In said drawings, the portions marked A represent the frame-work of my improved machine; B, the side tables; C, grain-carrier bars in said tables; D, band-cutter bars; E, a central grain-carrier table; F, a revolving grain-scatterer; G, the thrasher-cylinder; H, spring-bars for holding the bundles of grain against the carrier-bars C; I J, counter-shafts; and 1 to 21, inclusive, the various pulleys and belts by which the machine is driven.

The frame, thrasher-cylinder, counter-shafts, belts, and pulleys are similar to the corresponding portions in other machinery, and need no further description other than the incidental mention which may be given them in describing the other parts.

The side frames, B, are mounted on the journal-boxes $c'$, which are formed to serve, in addition to their primary purpose of bearings for the shafts $C'$, as pivots for these frames. This arrangement makes the axes of the shafts and table-pivots coincident, and therefore the mechanism mounted on the tables can be driven as well when they are raised as when they are in their ordinary positions. Each of these tables is raised and lowered by means of the rack-bar $B'$ and pinion $b'$, said bar and pinion being held in engagement by the clevis $b^2$, which is suspended to the shaft of said pinion and passes around said rack-bar. A catch-link or pawl, $b^3$, upon said clevis engages with said bar, and holds it in the position to which it has been raised. Upon the inner edges of the tables B are extensions $B^2$, which extend out over the central table a portion of its width, and thus serve to deliver the grain at a point thereon inside of its outer edges. These extensions are journaled on the shafts $C'$, and are mainly supported thereby. Upon the frames A are pivoted the short vibrating levers $a'$, one end of which extends out under said extensions $B^2$ and the other end of which extends under the shafts $C'$. Small cams $c^5$ are mounted upon these shafts, and as said shafts revolve said projections come in contact with the levers $a'$ and force the inner ends thereof down, thus forcing the outer ends up and with them the extensions $B^2$. Said extensions are thus given a vertical movement, which tosses the grain as it passes over them, and prevents it from lodging thereon, and also sifts or scatters the straw regularly in a stream as it passes forward. It will be noticed that the raising and lowering of the side tables proper have no effect on these extensions.

The grain-carrier bars C are mounted on double-crank shafts $C'\ C^2$, one of which, $C'$, is extended to near the shaft $F'$, to which it is connected by gear-wheels $c^2\ f^2$, (see especially Fig. 5,) whereby it and said bars are driven. An identical motion of the two shafts in each table is assured by the use of a belt, 18. Each of the bars C is provided with several upwardly-projecting teeth, $c$, Figs. 4 and 5, which engage with and force the bundles of grain forward as said bars execute their upward-and-forward movement. As will be readily understood, the crank-shafts C' revolve in that direction that drives the bars C forward as they rise above the table and backward as they fall beneath it.

The band-cutter bars D are mounted on the shafts D' D² and are driven transversely of the direction of movement of the bars C, but operate in a similar manner—i. e., with an upward-and-forward and downward-and-rearward stroke, whereby their paths during the forward or cutting movement are brought nearer the centers of the bundles than during their rearward or non-cutting movement. The driving-power is communicated from the shafts C' through the medium of the gears c³ d' and the shafts D'. Belts 21 operate to insure that the shafts D' D² shall revolve in the same direction. The cutters d are preferably triangular blades, as shown in Figs. 2 and 3, the perpendicular edges being intended for cutting. As the bundles of grain pass down the tables one or more of these cutters engage with and sever the bands thereof, permitting the grain to scatter out in proper position for thrashing.

The central table is composed of a frame-work, E, and a number of revolving carriers, E'. The frame E is sustained by a pivot, e, at one end and suspension rods or straps e² (see Figs. 1 and 5) at the other. The carriers E' are mounted on bearings in the frame E and are preferably driven by a chain belt, e', which engages with suitable pulleys on the ends of the several shafts of the carriers and is driven by a shaft, E². Said shaft is provided with a gear or pulley, e², at or near its center, which engages with a similar gear, e³, on a shaft, E³, directly below it. This shaft is driven from a counter-shaft, E⁴, by means of pulleys 13 and 14 and belt 15 and said counter-shaft from any convenient part of the machine, as the counter-shaft J. The whole table is given a sidewise vibrating movement by means of the vertical shaft E⁵, which is provided with a crank-arm at both the top and the bottom, the top one being connected by a pitman, f³, to the crank-wheel F³ on the shaft F', and the bottom one being connected to the frame E of the table by a connecting-rod, e⁵. This table is intended to have only a moderate or rather slow movement, but it serves to equally distribute the grain as it passes over it. The sidewise vibrating movement, as is well known, is a very efficient means of shaking grain, and the rotary carriers E' operate to toss and agitate it thoroughly, and allow any stones or other like foreign substances to fall through between them, and fall onto the bottom A', along which they, together with any grain which may have been dislodged, will pass into the machine to near the fan and be separated. The table, by a somewhat different method of mounting, may be vibrated at both ends, instead of one, without departing from my invention.

The revolving scatterer F is essentially a frame having teeth projecting outwardly therefrom, and adapted to be moved periodically longitudinally of its shaft. There is preferably a cylindrical shell which incloses this frame and its operating mechanism, but which has grooves or slots in its sides, in which the toothed bars of said frame-work move. The frame is operated by levers f, mounted on pivots f³, which have their bearings in the surrounding casing connected to the frame F by pivots at one end and provided with operating-bars f⁴ connected thereto by other pivots at the other, and extending through the ends of the cylinder to the outside. Upon the frame-work A at each end of this device is an inclined strike, a, with which the ends of the operating-bars f⁴ will successively come in contact as the scatterer revolves—that is, one bar f⁴ will come in contact with its strike at the proper time, and the other bar will come in contact with its strike when the device has made one-half of a further revolution, and so on successively, thus forcing the toothed frame alternately in one and the other directions, and tearing open and more thoroughly distributing any bunches of grain that may escape the other devices before allowing them to enter the thrasher-cylinder. It also serves to spread the grain out to the extreme ends of the thrasher-cylinder, supplementing the action of the central table in this respect. The strikes a are so arranged as to move the frame just as its teeth are pointing downwardly and while they are inserted in the grain. By reason of the levers f having the greater portion of their length between the pivots f³ and the point of attachment to the toothed bars the latter are moved very quickly, and are also moved a greater distance than are the operating-bars, and thus the friction between the latter and the strikes a is considerably reduced from what it would otherwise be.

The spring-bars H are arranged above the side tables, B, and serve to hold the bundles of grain down closely upon said tables, so that the teeth in the reciprocating carriers and the knives of the band-cutter shall be sure to effectively operate thereon. These bars also serve to retain the grain on the side tables until it is picked or torn out and thrown onto the central table by the action of the teeth c in the carriers. By this means the grain is delivered in smaller quantities and more steadily to the central table than would otherwise be possible.

Upon the shafts C², I usually mount fingers C⁴, which rotate therewith. The bearings of these fingers are formed by drilling holes through the shafts, so that the axes of the shafts and those of the fingers shall cross and be at right angles with each other. Upon each of said fingers I mount small gear-wheels c⁴, and upon the adjacent frame-work I secure corresponding cogged rims, b⁴, whereby each finger is caused to rotate upon its own axis, as well as around the shaft upon which it is mounted. The long or operating end of each finger is curved, as shown in Figs. 1 and 7, and is so arranged that when it comes up above the table it operates to thrust forward any bundle of grain with which it may come in contact, thus straightening it with relation to the table. The object of these fingers $C^4$ is to catch the bundles as they are thrown upon the table, square them therewith, and force them forward until they can be reached by the carriers C.

Ordinarily in my invention the power is transmitted from the shaft of the thrasher-cylinder to the other mechanism by a system of belts and pulleys. The pulley 1 is upon said shaft, and by means of the belt 2 and pulley 3 drives the counter-shaft I, which in turn, through the cone-pulleys 4 and 5 and belt 6, drives the counter-shaft J. This is provided at one end with the pulley 7, which through the belt 8 and pulley 9 drives the scatterer F, and at the other end with the pulley 10, which through the belt 11 and pulley 12 drives the counter-shaft $E^4$, which through the pulleys 13 and 14 and belt 15 drives the shaft $E^3$, which last through the pulleys or gears $e^3$ $e^2$ drives the shafts of the rotary carriers $E'$, through the chain-belt $e'$. The pulleys 16 and 17 and belt 18 insure a coincident motion of the shafts $C'$ and $C^2$, and the pulleys 19 and 20 and belt 21 serve the same purpose as regards the shafts $D'$ and $D^2$.

It will be understood that in the following claims I do not intend to limit myself to the exact construction shown as to all the parts, it being immaterial to the operation of some of the parts specifically claimed whether or not the other parts are those shown or other devices which will accomplish substantially the same purpose or result.

The foregoing statement is made in lieu of an extended description of various equivalent or alternate devices which might be used instead of some of those shown.

Having thus fully described my said invention, what I claim as new, and desire to secure by Letters Patent, is—

1. The combination, with the cylinder and grain-carriers of a thrashing-machine, of a revolving scatterer consisting essentially of two toothed bars, F, parallel with but on opposite sides of its axis, bars $f$, and operating-bars $f^4$, and strikes $a$ on the frame-work, with which said operating-bars come in contact as the scatterer revolves, whereby the toothed bars are caused to make sudden movements longitudinally of their shaft, thus distributing and scattering the grain, substantially as set forth.

2. The combination of the frame E, suspending devices $e$ $e'$ $e^2$, slats $E'$ in said frame, and means for imparting a rotary movement to said slats and a sidewise or vibrating movement to the frame, substantially as set forth.

3. In a band-cutting and feeding attachment for thrashing-machines, the side tables, B, having carriers which operate to move the grain toward the center table between them, in combination with reciprocating band-cutters D, which operate transversely of the direction in which said carriers operate, (their forward paths being nearer the centers of the bundles than their backward paths,) and located between said carriers, substantially as shown and specified.

4. In a band-cutter and feeder for thrashing-machines, the combination of the adjustable side tables, B, band-cutting and feeding mechanism therein, the shaft for driving said mechanism, and the combined journal and pivot bearings $c'$, in which said shaft runs and whereon said tables are pivoted, whereby the axis of rotation of the shaft and of the swing of the table are rendered coincident, substantially as shown and described, and for the purposes specified.

5. The combination, with the side tables, B, of the aprons or extensions $B^2$, the levers $a'$, and cams $c^5$ on the shafts $C'$, for operating the same, substantially as shown and specified.

6. The combination of the side table, B, carriers C therein, and spring-bars H, said several parts being constructed, arranged, and operating substantially as shown and specified.

7. The combination, with the pivoted side table, B, of the ratchet-bar $B'$, the pinion $b'$, the clevis $b^2$, and the swinging pawl $b^3$, substantially as described, and for the purposes specified.

8. The combination, with the grain-carriers and their shafts $C^2$, of the fingers $C^4$, substantially as set forth.

9. The combination of the shaft $C^2$, fingers $C^4$, provided with gears $c^4$, and table B, provided with cogged rims $b^4$, substantially as set forth.

In witness whereof I have hereunto set my hand and seal, at Indianapolis, Indiana, this 3d day of July, A. D. 1882.

GEORGE W. SHARP. [L. S.]

In presence of—
C. BRADFORD,
E. W. BRADFORD.